(12) United States Patent
Chen et al.

(10) Patent No.: US 11,805,046 B2
(45) Date of Patent: Oct. 31, 2023

(54) BORDER GATEWAY PROTOCOL (BGP) FOR ROUTING POLICY DISTRIBUTION

(71) Applicant: Huawei Technologies Co., Ltd., Shenzhen (CN)

(72) Inventors: Huaimo Chen, Bolton, MA (US); Zhenbin Li, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 17/231,849

(22) Filed: Apr. 15, 2021

(65) Prior Publication Data

US 2021/0273876 A1 Sep. 2, 2021

Related U.S. Application Data

(63) Continuation of application No. PCT/US2019/056762, filed on Oct. 17, 2019.

(60) Provisional application No. 62/748,222, filed on Oct. 19, 2019.

(51) Int. Cl.
| | |
|---|---|
| *H04L 45/02* | (2022.01) |
| *H04L 45/12* | (2022.01) |
| *H04L 45/24* | (2022.01) |
| *H04L 45/44* | (2022.01) |
| *H04L 45/741* | (2022.01) |
| *H04L 41/0803* | (2022.01) |

(52) U.S. Cl.
CPC .......... *H04L 45/04* (2013.01); *H04L 41/0803* (2013.01); *H04L 45/123* (2013.01); *H04L 45/24* (2013.01); *H04L 45/44* (2013.01); *H04L 45/741* (2013.01)

(58) Field of Classification Search
CPC ..... H04L 45/04; H04L 41/0803; H04L 45/24; H04L 45/44; H04L 45/741
See application file for complete search history.

(56) References Cited

U.S. PATENT DOCUMENTS

| | | | |
|---|---|---|---|
| 7,233,593 B2 | 6/2007 | Chavali | |
| 2003/0169689 A1 | 9/2003 | Chavali | |
| 2006/0227723 A1* | 10/2006 | Vasseur | ................... H04L 45/02 370/254 |

(Continued)

FOREIGN PATENT DOCUMENTS

CN 107005474 A 8/2017

OTHER PUBLICATIONS

Chandra, R., et al., "BGP Communities Attribute," Network Working Group, RFC 1997, Aug. 1996, 5 pages.

(Continued)

*Primary Examiner* — Abdulkader M Alriyashi
(74) *Attorney, Agent, or Firm* — Conley Rose, P.C.

(57) ABSTRACT

A method for extending Border Gateway Protocol (BGP) to change multiple route attributes at a time. The method includes receiving a BGP wide community container that includes an indication that multiple route attributes can be changed at a time, a one or more route conditions, and actions to perform on the multiple route attributes when the one or more route conditions are met. The method determines whether the route conditions are satisfied. The method performs the actions specified in the BGP wide community container on the multiple route attributes when the one or more route conditions are satisfied.

20 Claims, 18 Drawing Sheets

(56) References Cited

U.S. PATENT DOCUMENTS

2013/0132542 A1* 5/2013 Zhang ............... H04L 45/04
709/223
2018/0131604 A1 5/2018 Zhou et al.

OTHER PUBLICATIONS

Bradner, S., "Key words for use in RFCs to Indicate Requirement Levels," Network Working Group, RFC 2119, Mar. 1997, 3 pages.
Rekhter, Y., Ed., et al., "A Border Gateway Protocol 4 (BGP-4)," Network Working Group, RFC 4271, Jan. 2006, 104 pages.
Bates, T., et al., "Multiprotocol Extensions for BGP-4," Network Working Group, RFC 4760, Jan. 2007, 12 pages.
Scudder, J., et al., "Capabilities Advertisement with BGP-4," Network Working Group, RFC 5492, Feb. 2009, 7 pages.
Marques, P., et al., "Dissemination of Flow Specification Rules," Network Working Group, RFC 5575, Aug. 2009, 22 pages.
Raszuk, R., Ed., et al., "BGP Communication Container Attribute," draft-ietf-idr-wide-bgp-communities-05, Jul. 2, 2018, 25 pages.
Raszuk, R., Ed., et al., "Registered Wide BGP Community Values," draft-ietf-idr-registered-wide-bgp-communities-02, May 31, 2016, 18 pages.
Li, Z., et al, "BGP FlowSpec Extensions for Routing Policy Distribution (RPD)" draft-li-idr-flowspec-rpd-02, Jun. 17, 2016, 23 pages, XP015113563.
Shaikh, A., et., et al, "BGP Model for Service Provider Networks," draft-shaikhidr-bgp-model-02, Jun. 14, 2015, 77 pages, XP015106695.
Raszuk, R., Ed., et al, "Wide BGP Communities Attribute," draft-raszuk-widebgp-communities-04, Feb. 13, 2014, 24 pages, XP015096818.

* cited by examiner

| Type | Description |
|---|---|
| 1 | Autonomous System Number List |
| 2 | IPv4 Prefix (1 octet prefix length + prefix) List |
| ... | ... |
| 8 | UTF-8 String |
| TBD1 | BGP IPv4 Session (local address and remote address) |
| TBD2 | BGP IPv6 Session (local address and remote address) |
| TBD3 | IPv4 Prefix Range/Match |
| TBD4 | IPv6 Prefix Range/Match |
| TBD5 | AS Path |
| TBD6 | Communities |
| TBD7 | Add AS-Path |
| TBD8 | Change MED |
| TBD9 | Deny |

Types 1–8: EXISTING; TBD1–TBD9: NEW

```
1200 →
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   | Type (TBD7) 1202|   Length (Variable) 1204    |    OP 1206    |
   +-+-+-+-+-+-+-+-+-+-+-+-+-+-+-+-+-+-+-+-+-+-+-+-+-+-+-+-+-+-+-+-+
   |   Count1 1212   |                                             |
   +-+-+-+-+-+-+-+-+-+            AS1 1208                         |
   |                                                               |
   +-+-+-+-+-+-+-+-+-+-+-+-+-+-+-+-+-+-+-+-+-+-+-+-+-+-+-+-+-+-+-+-+
                                  .
                                  .
                                  .
   +-+-+-+-+-+-+-+-+-+-+-+-+-+-+-+-+-+-+-+-+-+-+-+-+-+-+-+-+-+-+-+-+
   |   Countn 1212n  |                                             |
   +-+-+-+-+-+-+-+-+-+            ASn 1208n                        |
   |                                                               |
   +-+-+-+-+-+-+-+-+-+-+-+-+-+-+-+-+-+-+-+-+-+-+-+-+-+-+-+-+-+-+-+-+
```

*FIG. 12*

```
1300 ↘
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type (TBD8) 1302|   Length (5) 1304   |          OP 1306      |
+-+-+-+-+-+-+-+-+-+-+-+-+-+-+-+-+-+-+-+-+-+-+-+-+-+-+-+-+-+-+-+-+
|                            Value 1308                         |
+-+-+-+-+-+-+-+-+-+-+-+-+-+-+-+-+-+-+-+-+-+-+-+-+-+-+-+-+-+-+-+-+
```

*FIG. 13*

```
+-------+----------------------+
| Value |   Description        |
+-------+----------------------+
|   1   | BLACKHOLE            |
|   2   | SOURCE FILTER        |
|  ...  |      ...             |
|  24   | FREE POOL            |
| TBD11 | change attributes    |
| TBD12 | no advertise         |
+-------+----------------------+
```

1500

EXISTING (braces around rows 1–24)
NEW (braces around TBD11–TBD12)

```
1600
   ↘
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |      Container Type: 1  1602   |Flags  1604 |0|1| Reserved(0)    |
   +-+-+-+-+-+-+-+-+-+-+-+-+-+-+-+-+-+-+-+-+-+-+-+-+-+-+-+-+-+-1606+
   | Length:     1608                71 |
   +-+-+-+-+-+-+-+-+-+-+-+-+-+-+-+-+-+-+-+-+-+-+-+-+-+-+-+-+-+-+-+-+
   | Community: Change Attributes       1612                  TBD11 |
   +-+-+-+-+-+-+-+-+-+-+-+-+-+-+-+-+-+-+-+-+-+-+-+-+-+-+-+-+-+-+-+-+
   | Source AS    1614                                        64496 |
   +-+-+-+-+-+-+-+-+-+-+-+-+-+-+-+-+-+-+-+-+-+-+-+-+-+-+-+-+-+-+-+-+
   | Context AS   1616                                        64496 |
   +-+-+-+-+-+-+-+-+-+-+-+-+-+-+-+-+-+-+-+-+-+-+-+-+-+-+-+-+-+-+-+-+
   | Target TLV: 1 |   Length:    1622              18 |
   | 1618
   +-+-+-+-+-+-+-+-+-+-+-+-+-+-+-+-+-+-+-+-+-+-+-+-+-+-+-+-+-+-+-+-+ ⎫
   |PrefxRange:TBD3|   Length:                 6 | Flags (0)      |  ⎪
   +-+-+-+-+-+-+-+-+-+-+-+-+-+-+-+-+-+-+-+-+-+-+-+-+-+-+-+-+-+-+-+-+  ⎪
   | MaskLen: 20   | LeMaskLen: 24 |IPv4 Prefix:         20.20.  |   ⎬ ─700
   +-+-+-+-+-+-+-+-+-+-+-+-+-+-+-+-+-+-+-+-+-+-+-+-+-+-+-+-+-+-+-+-+  ⎪
   |.15            |                                                  ⎪
   +-+-+-+-+-+-+-+-+-+-+-+-+-+-+-+-+-+-+-+-+-+-+-+-+-+-+-+-+-+-+-+-+ ⎭
   | AS Path: TBD5 |   Length:                 6 | OP:          1 | ⎫
   +-+-+-+-+-+-+-+-+-+-+-+-+-+-+-+-+-+-+-+-+-+-+-+-+-+-+-+-+-+-+-+-+ ⎪
   | AS                       6553601                               | ⎬ ─1000
   +-+-+-+-+-+-+-+-+-+-+-+-+-+-+-+-+-+-+-+-+-+-+-+-+-+-+-+-+-+-+-+-+ ⎪
   | Count      2 |                                                   ⎭
   +-+-+-+-+-+-+-+-+-+-+-+-+-+-+-+-+-+-+-+-+-+-+-+-+-+-+-+-+-+-+-+-+
   |ExcTargetTLV: 2|   Length:                                  0 |
   | 1624
   +-+-+-+-+-+-+-+-+-+-+-+-+-+-+-+-+-+-+-+-+-+-+-+-+-+-+-+-+-+-+-+-+
   |Param TLV:   3|   Length:                                  32 |
   | 1626
   +-+-+-+-+-+-+-+-+-+-+-+-+-+-+-+-+-+-+-+-+-+-+-+-+-+-+-+-+-+-+-+-+ ⎫
   |ChangeMED: TBD8|   Length:                 5 | OP:          2 | ⎬ ─1300
   +-+-+-+-+-+-+-+-+-+-+-+-+-+-+-+-+-+-+-+-+-+-+-+-+-+-+-+-+-+-+-+-+ ⎪
   | Value:                                                  12345 | ⎭
   +-+-+-+-+-+-+-+-+-+-+-+-+-+-+-+-+-+-+-+-+-+-+-+-+-+-+-+-+-+-+-+-+
   |AddASPath: TBD7|   Length:                11 | OP:          1 | ⎫
   +-+-+-+-+-+-+-+-+-+-+-+-+-+-+-+-+-+-+-+-+-+-+-+-+-+-+-+-+-+-+-+-+ ⎪
   | AS                       123456                                | ⎪
   +-+-+-+-+-+-+-+-+-+-+-+-+-+-+-+-+-+-+-+-+-+-+-+-+-+-+-+-+-+-+-+-+ ⎬ ─1200
   | Count      1 |                                                   ⎪
   +-+-+-+-+-+-+-+-+-+-+-+-+-+-+-+-+-+-+-+-+-+-+-+-+-+-+-+-+-+-+-+-+ ⎪
   | AS                       6553602                               | ⎪
   +-+-+-+-+-+-+-+-+-+-+-+-+-+-+-+-+-+-+-+-+-+-+-+-+-+-+-+-+-+-+-+-+ ⎪
   | Count      4 |                                                   ⎭
   +-+-+-+-+-+-+-+-+
```

BORDER GATEWAY PROTOCOL (BGP) FOR ROUTING POLICY DISTRIBUTION

CROSS-REFERENCE TO RELATED APPLICATIONS

This patent application claims priority to International Application No. PCT/US2019/056762 filed on Oct. 17, 2019, by Futurewei Technologies, Inc., and titled "Border Gateway Protocol (BGP) For Routing Policy Distribution," which claims priority to U.S. provisional patent application No. 62/748,222 filed Oct. 19, 2018, by Huaimo Chen et al., and titled "Border Gateway Protocol (BGP) For Routing Policy Distribution," which are hereby incorporated in their entirety by reference.

TECHNICAL FIELD

The present application relates to communication networking, and more particularly to BGP Routing Policy Distribution.

BACKGROUND

An autonomous system (AS) is a set of routers that is under a single technical administration. An AS normally uses a single Interior Gateway Protocol (IGP) and a common set of metrics to propagate routing information within the set of routers. The Internet consists of thousands of Autonomous Systems (ASes) networks that are each owned and operated by a single institution.

Border Gateway Protocol (BGP) is the routing protocol used to exchange reach-ability information across ASes. BGP routing information includes the complete route to each destination, as well as additional information about the route (i.e., route attributes). The route to each destination is called the AS path. BGP uses the AS path and the route attributes to maintain a database of network reachability information, which it exchanges with other BGP systems. BGP allows for policy-based routing. Routing policies can be used to choose among multiple paths to a destination and to control the redistribution of routing information. BGP uses the network reachability information to construct a graph of AS connectivity, which enables BGP to remove routing loops and enforce policy decisions at the AS level.

Route tagging plays an important role in external BGP relations, in communicating various routing policies between peers. It is also a very common best practice among operators to propagate intra-domain various additional information about routes. The most common tool used today to attach additional information about routes is through the use of BGP communities. A BGP community is a group of routes that share a common property, regardless of their network, autonomous system, or any physical boundaries. BGP communities allow networks to share extra bits of information about routes. This allows network operators to better tune the traffic coming in and out of their network. BGP communities also have the ability to specify an operator's defined set of parameters or attributes in a BGP Community Container. Atoms provide data types in the format of Type-Length-Value (TLV) that can be used to encode contents of BGP Community Containers.

SUMMARY

A first aspect relates to a computer-implemented method for extending BGP to change multiple route attributes at a time. The method includes providing, in a BGP wide community container, an indication that multiple route attributes can be changed at a time, one or more route conditions, and actions to perform on the multiple route attributes when the one or more route conditions are satisfied (i.e., the conditions specified in the in a BGP wide community container match the conditions of the route). The method transmits the BGP wide community container to a neighboring BGP router.

A second aspect relates to a computer-implemented method for extending BGP to change multiple route attributes at a time. The method includes receiving a BGP wide community container that includes an indication that multiple route attributes can be changed at a time, one or more route conditions, and actions to perform on the multiple route attributes when the one or more route conditions are satisfied. The method performs the actions specified in the BGP wide community container on the multiple route attributes when the one or more route conditions are satisfied.

In a first implementation form of the computer-implemented method according to any preceding aspect, the indication is a wide community type value that corresponds to a change attributes action.

In a second implementation form of the computer-implemented method according to any preceding aspect or any preceding implementation form of any preceding aspect, the one or more route conditions are specified in at least one of the following wide-community-Atoms: a BGP Internet Protocol version 4 (IPv4) Session wide-community-Atom, a BGP Internet Protocol version 6 (IPv6) Session wide-community-Atom, an IPv4 Prefix Range wide-community-Atom, an IPv6 Prefix Range wide-community-Atom, and an autonomous system (AS) Path wide-community-Atom.

In a third implementation form of the computer-implemented method according to any preceding aspect or any preceding implementation form of any preceding aspect, the actions to perform on the multiple route attributes are specified in at least one of the following wide-community-Atoms: Communities, Add AS-Path, Change MED, and Deny.

In a fourth implementation form of the computer-implemented method according to any preceding aspect or any preceding implementation form of any preceding aspect, the BGP Internet Protocol version 4 (IPv4) Session wide-community-Atom comprises a Type field, Length field, Local IPv4 Address field, and Remote IPv4 Address field.

In a fifth implementation form of the computer-implemented method according to any preceding aspect or any preceding implementation form of any preceding aspect, the BGP Internet Protocol version 6 (IPv6) Session wide-community-Atom comprises a Type field, Length field, Local IPv6 Address field, and Remote IPv6 Address field.

In a sixth implementation form of the computer-implemented method according to any preceding aspect or any preceding implementation form of any preceding aspect, the IPv4 Prefix Range wide-community-Atom comprises a Type field, Length field, Flags field, and a number of triples in the form of <IPv4 Address field, MaskLen field, LeMaskLen field>.

In a seventh implementation form of the computer-implemented method according to any preceding aspect or any preceding implementation form of any preceding aspect, the IPv4 Prefix Range wide-community-Atom comprises a Type field, Length field, Flags field, and a number of triples in the form of <MaskLen field, LeMaskLen field, IPv4 Prefix field>.

In an eighth implementation form of the computer-implemented method according to any preceding aspect or any preceding implementation form of any preceding aspect, the IPv6 Prefix Range wide-community-Atom comprises a Type field, Length field, Flags field, and a number of triples in the form of <IPv6 Address field, MaskLen field, LeMaskLen field>.

In a ninth implementation form of the computer-implemented method according to any preceding aspect or any preceding implementation form of any preceding aspect, the IPv6 Prefix Range wide-community-Atom comprises a Type field, Length field, Flags field, and a number of triples in the form of <MaskLen field, LeMaskLen field, IPv6 Prefix field>.

In a tenth implementation form of the computer-implemented method according to any preceding aspect or any preceding implementation form of any preceding aspect, the AS Path wide-community-Atom comprises a Type field, Length field, Flags field, and a sequence of AS numbers fields.

In an eleventh implementation form of the computer-implemented method according to any preceding aspect or any preceding implementation form of any preceding aspect, the Communities wide-community-Atom comprises a Type field, Length field, Flags field, and a list of Community Value fields that represent a list of actions.

In a twelfth implementation form of the computer-implemented method according to any preceding aspect or any preceding implementation form of any preceding aspect, the Add AS-Path wide-community-Atom comprises a Type field, Length field, OP field, and a sequence of AS fields.

In a thirteenth implementation form of the computer-implemented method according to any preceding aspect or any preceding implementation form of any preceding aspect, the Change Multi-Exit Discriminator (MED) wide-community-Atom comprises a Type field, Length field, OP field, and a Value field.

In a fourteenth implementation form of the computer-implemented method according to any preceding aspect or any preceding implementation form of any preceding aspect, the Deny wide-community-Atom comprises a Type field and Length field.

A third aspect relates to a network node comprising network communication means, a data storage means, and a processing means, the network node specially configured to perform any of the preceding method claims.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a chart illustrating new wide-community-Atoms according to an embodiment of the present disclosure.

FIG. 12 is a schematic diagram illustrating an Add AS Path wide-community-Atom according to an embodiment of the present disclosure.

FIG. 13 is a schematic diagram illustrating a Change MED wide-community-Atom according to an embodiment of the present disclosure.

FIG. 16 is a schematic diagram illustrating an example encoding for a BGP wide community container for change attributes according to an embodiment of the present disclosure.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosed embodiments provide an efficient solution for extending BGP to enable multiple actions to be applied to a route at one time (e.g., by changing multiple route attributes at one time). The disclosed embodiments eliminate the inefficiency of the existing BGP Routing Policy Distribution that can only apply one action to a route at a time. The disclosed embodiments also provide more efficient encodings for certain data. The disclosed embodiments can be deployed in any controller, router, and switch, which are used by the service providers around world to provide quality of service (QoS) to customers.

Figure 1:
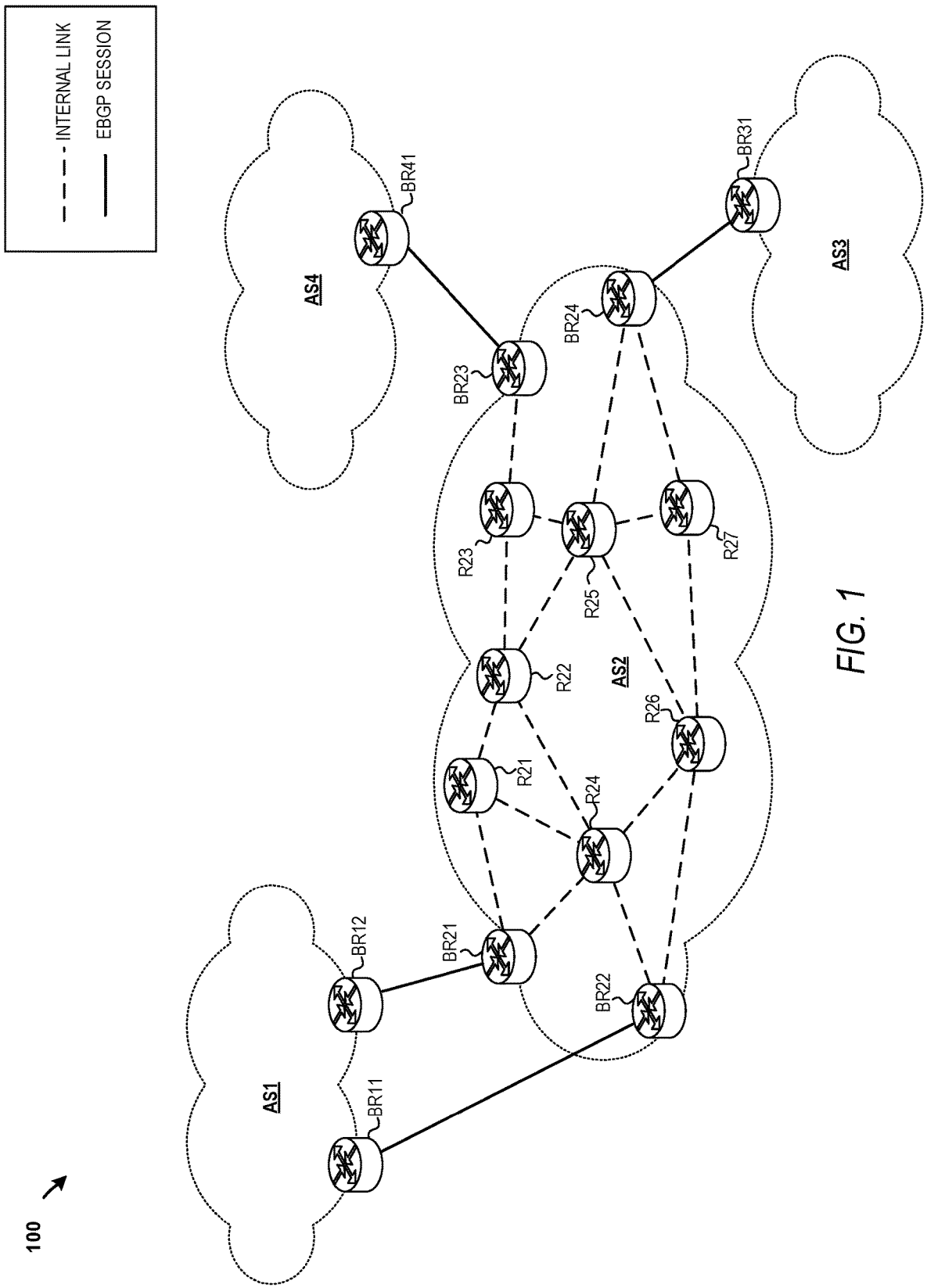
FIG. 1 is a schematic diagram illustrating a network according to an embodiment of the present disclosure.

FIG. 1 is a schematic diagram illustrating a BGP network 100 according to an embodiment of the present disclosure. The BGP network 100 is made up of a number of ASes networks such as, but not limited to, AS1, AS2, AS3, and AS4. Each of the ASes are typically owned and operated by a single institution. BGP sessions are established between border routers (BRs) that reside at the edges of an AS and border routers in neighboring ASes (also referred to external-BGP (eBGP)). For example, in the depicted embodiment, border router BR11 in AS1 has an established BGP session with BR22 in AS2 (also referred to eBGP session). Other eBGP sessions between border routers in different ASes are also depicted in FIG. 1. These eBGP sessions are used to exchange routes between neighboring ASes. Border routers then distribute routes learned on these sessions to nonborder (i.e., internal) routers (e.g., internal routers R21-R27 in AS2) as well as other border routers (e.g., BR23 and BR24 in AS2) in the same AS using internal-BGP (iBGP). In addition, the routers in an AS usually run an IGP to learn the internal network topology and compute paths from one router to another. Each router combines the BGP and IGP information to construct a forwarding/routing table that maps each destination prefix to one or more outgoing links along shortest paths through the network to the chosen border router. A BGP route or path consists of a network number, a list of ASs through which information has passed (i.e., the AS path), and the defined route attributes.

Each BGP router then exchanges its routing table with its defined internal and external neighboring BGP routers. Once a complete routing table is exchanged between neighbors, only changes to that information are exchanged. These changes may be new route advertisements, route withdrawals, or changes to route attributes. Route attributes give operators greater control over route selection, by allowing a router to alter its decisions based on the values of these route attributes. Non-limiting examples of route attributes include Local Preference (LocalPref) and Multi-Exit Discriminator (IVIED). The LocalPref attribute can be used by an operator to force a route with a longer AS path to be chosen over a shorter one. The MED attribute is typically used by two ASes connected by multiple links to indicate which peering link should be used to reach the AS advertising the attribute.

Currently, the existing BGP Routing Policy Distribution can only apply one action or change to a route (e.g., can only change one route attribute) at a time. The present disclosure describes various methods and data structures for extending BGP to change multiple route attributes at a time. The phrase "at a time" as used herein means with one communication or message. For instance, currently, it requires multiple messages to change more than one route attribute. The disclosed embodiments eliminate this inefficiency. In an embodiment, an indication that multiple route attributes can be changed at a time is provided in a BGP wide community container that contains one or more route conditions, and actions to perform on the multiple route attributes when the one or more route conditions are met. The BGP wide community container is then transmitted to a neighboring BGP router.

Figure 2:
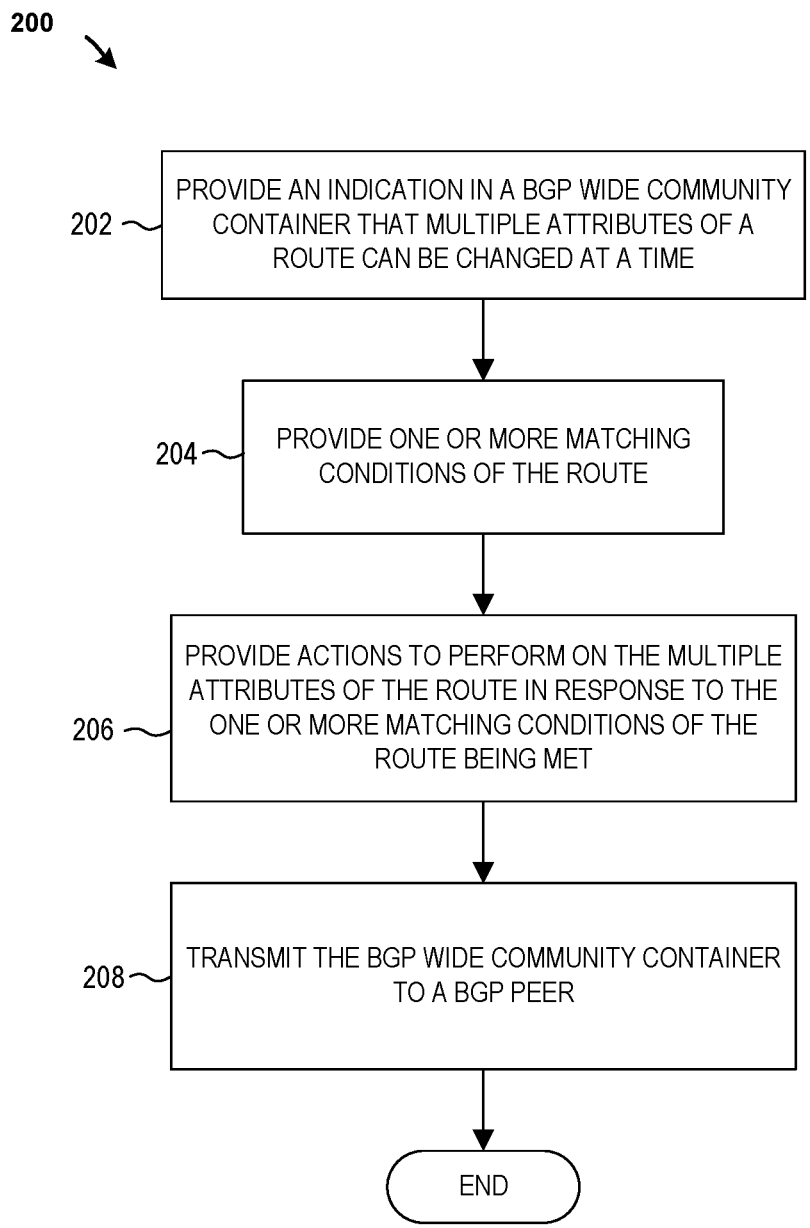
FIG. 2 is a flowchart illustrating a method for extending BGP to change multiple route attributes at a time according to an embodiment of the present disclosure.

FIG. 2 is a flowchart illustrating a method 200 for extending BGP to change multiple route attributes at a time according to an embodiment of the present disclosure. The method 200 can be executed by a network node such as, any controller, router, and switch. As an example, the method 200 can be executed by BR21 in FIG. 1. The method 200 begins, at step 202, by providing, in a BGP wide community container (or BGP Wide Community for short), an indication that multiple route attributes can be changed at a time. As will be further described, a BGP Wide Community is a BGP Community Container of Type 1. The BGP Wide Community is of variable size and contains a Community Value, the Source AS Number, and the Context AS Number, followed by optional TLVs. A TLV is an encoding scheme that uses a type-length-value encoding format or structure for providing additional information for certain protocols. Typically, the type and length are fixed in size (typically 1-4 bytes), and the value field is of variable size.

According to an embodiment of the present disclosure, the BGP Wide Community includes a "change attributes" wide community action to indicate that multiple attributes can be changed. The parameters and operations for the action are represented by Atoms, as described herein, in the BGP Wide Community related to the operations. These Atoms are included in a BGP Wide Community Parameter(s) TLV. Examples of Atoms disclosed herein include "Add AS-Path" and "Change MED."

The method 200, at step 204, provides, in the BGP wide community container, one or more route conditions. As described herein, the one or more route conditions are specified in at least one of the following new wide-community-Atoms: BGP Internet Protocol version 4 (IPv4) Session, BGP Internet Protocol version 6 (IPv6) Session, IPv4 Prefix Range, IPv6 Prefix Range, and AS Path. The BGP IPv4 Session wide-community-Atom specifies a BGP IPv4 Session using a Local IPv4 Address and Remote IPv4 Address. Similarly, the BGP IPv6 Session wide-community-Atom specifies a BGP IPv6 Session using a Local IPv6 Address and Remote IPv6 Address. The IPv4 Prefix Range and IPv6 Prefix Range specify a prefix range (e.g., prefixes from 20.20.15.0/20 to 20.20.15.0/24). The AS Path wide-community-Atom specifies a sequence of AS numbers.

At step 206, the method provides, in the BGP wide community container, actions to perform on the multiple route attributes when the one or more route conditions are met. In accordance with the disclosed embodiments, the actions to perform on the multiple route attributes are specified in at least one of the following new wide-community-Atoms: Communities, Add AS-Path, Change MED, and Deny. The Communities wide-community-Atom provides a list of Community Values that represent a list of actions. The Add AS-Path wide-community-Atom provides a sequence of AS numbers to add to an existing AS Path. The Change MED wide-community-Atom can be used to change the MED attribute. The MED attribute is an attribute that can affect how an AS reaches a certain route when there are multiple entry points for that AS. The Deny wide-community-Atom is used to indicate a Deny action. Each of the above wide-community-Atoms is discussed in detail in the following figures. At step 208, the method 200 transmits the BGP wide community container out to a neighboring BGP router.

FIG. 3 is a chart 300 illustrating new wide-community-Atoms according to an embodiment of the present disclosure. A wide-community-Atom is a TLV or sub-TLV, which may be included in a BGP wide community container. Currently, the following eight wide-community-Atoms have been defined: Autonomous System Number List (Type Value 1), IPv4 Prefix list (Type Value 2), IPv6 Prefix list (Type Value 3), Integer32 list (Type Value 4), Institute of Electrical and Electronics Engineers (IEEE) Floating Point Number list (Type Value 5), Neighbor Class list (Type Value 6), Neighbor Class list (Type Value 7), User-defined Class list, and UTF-8 string.

The present disclosure defines nine new wide-community-Atoms (from TBD1 to TBD9) as illustrated in FIG. 3. The nine new wide-community-Atoms are BGP IPv4 Session, BGP IPv6 Session, IPv4 Prefix Range, IPv6 Prefix Range, AS Path, Communities, Add AS-Path, Change IVIED, and Deny.

Figure 4:
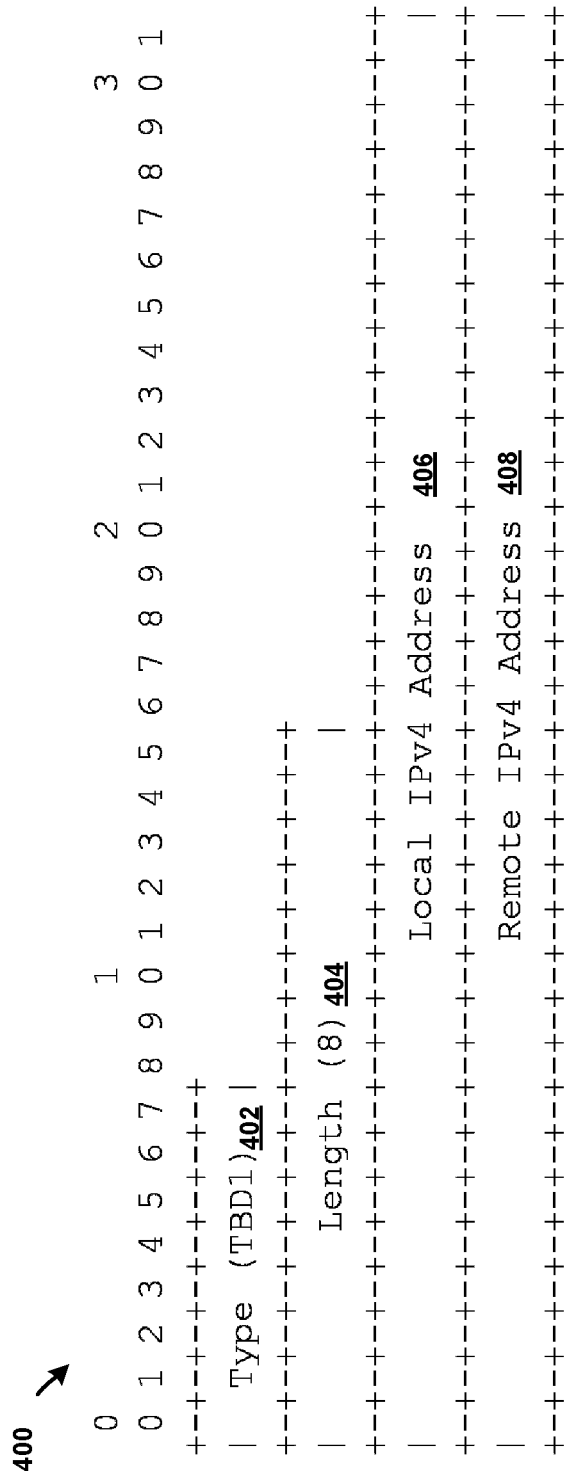
FIG. 4 is a schematic diagram illustrating a BGP IPv4 Session wide-community-Atom according to an embodiment of the present disclosure.

FIG. 4 is a schematic diagram illustrating a BGP IPv4 Session wide-community-Atom 400 according to an embodiment of the present disclosure. The BGP IPv4 Session wide-community-Atom 400 includes a Type 402 field, Length 404 field, Local IPv4 Address 406 field, and Remote IPv4 Address 408 field. The Type 402 field specifies a value, which is to be determined (TBD), to indicate that it is a BGP IPv4 Session wide-community-Atom 400. The Length 404 field specifies the length of the Local IPv4 Address 406 field and Remote IPv4 Address 408 field. The Local IPv4 Address 406 field contains a Local IPv4 Address for a BGP IPv4 Session, and the Remote IPv4 Address 408 field contains a Remote IPv4 Address for the BGP IPv4 Session.

Figure 5:
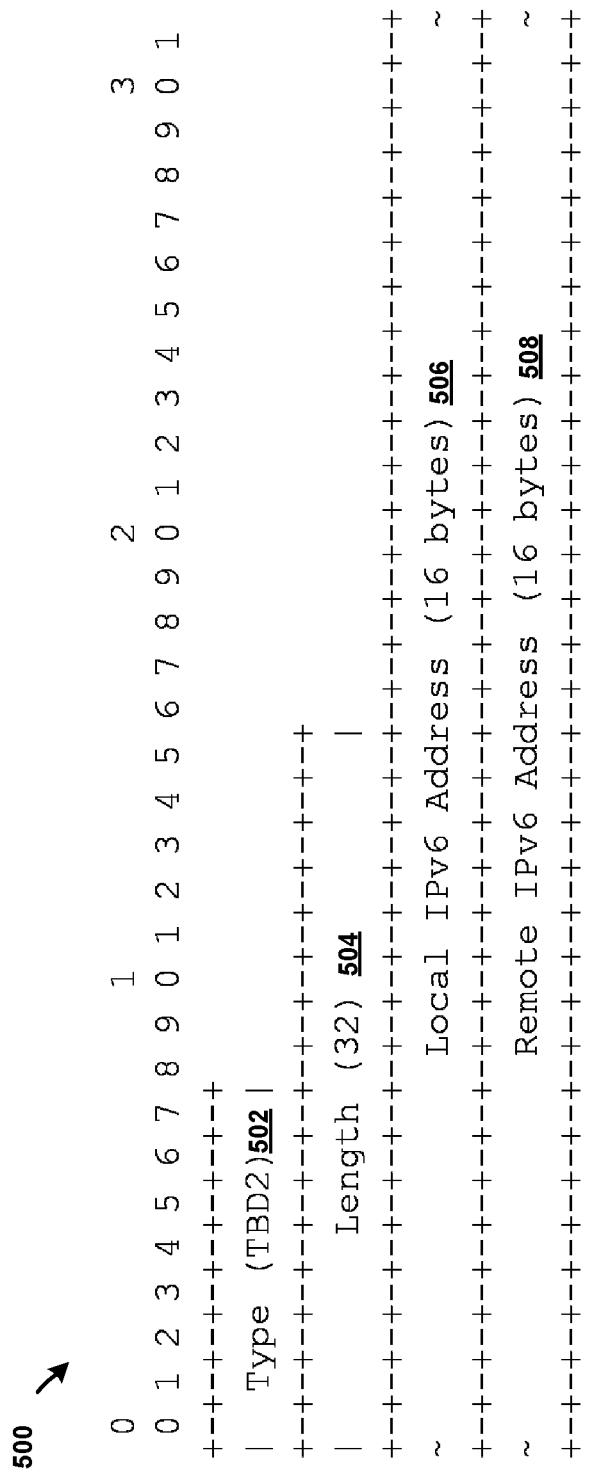
FIG. 5 is a schematic diagram illustrating a BGP IPv6 Session wide-community-Atom according to an embodiment of the present disclosure.

FIG. 5 is a schematic diagram illustrating a BGP IPv6 Session wide-community-Atom 500 according to an embodiment of the present disclosure. The BGP IPv6 Session wide-community-Atom 500 includes a Type 502 field, Length 504 field, Local IPv6 Address 506 field, and Remote IPv6 Address 508 field. The Type 502 field specifies a value, which is to be determined (TBD), to indicate that it is a BGP IPv6 Session wide-community-Atom 500. The Length 504 field specifies the length of the Local IPv6 Address 506 field and Remote IPv6 Address 508 field. The Local IPv6 Address 506 field contains a Local IPv6 Address for a BGP IPv6 Session, and the Remote IPv6 Address 508 field contains a Remote IPv6 Address for the BGP IPv6 Session. In an embodiment, both the Local IPv6 Address 506 field and the Remote IPv6 Address 508 field are 16 bytes.

Figure 6:
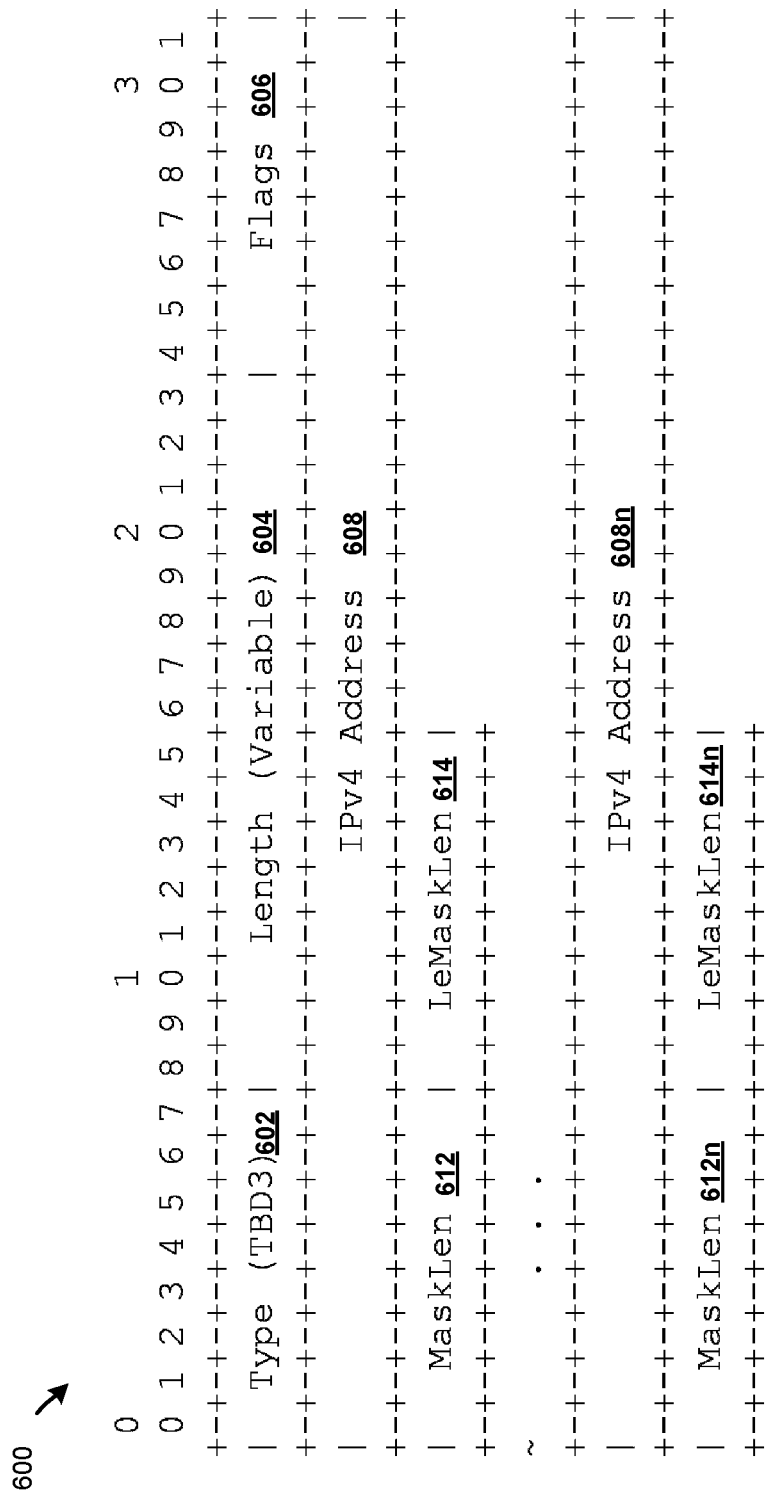
FIG. 6 is a schematic diagram illustrating an IPv4 Prefix Range wide-community-Atom according to an embodiment of the present disclosure.

FIG. 6 is a schematic diagram illustrating an IPv4 Prefix Range wide-community-Atom 600 according to an embodiment of the present disclosure. The IPv4 Prefix Range wide-community-Atom 600 represents a range of IPv4 prefixes. The IPv4 Prefix Range wide-community-Atom 600 includes a Type 602 field, Length 604 field, and Flags 606 field. The Type 602 field specifies a value, which is to be determined (TBD), to indicate that it is a IPv4 Prefix Range wide-community-Atom 600. The Length 604 field specifies the length of the IPv4 Prefix Range wide-community-Atom 600, excluding the Type 602 field and the Length 604 field. The Flags 606 field can be used to specify one or more flags for the IPv4 Prefix Range wide-community-Atom 600.

The IPv4 Prefix Range wide-community-Atom 600 contains a number of triples in the form of <IPv4 Address 608 field, MaskLen 612 field, LeMaskLen 614 field>, . . . , <IPv4 Address 608*n* field, MaskLen 612*n* field, LeMaskLen 614*n* field>. Each triple <IPv4 Address, MaskLen, LeMaskLen> represents an IPv4 prefix range from IPv4 Address/MaskLen to IPv4 Address/LeMaskLen. LeMaskLen, as used herein, is the length of the prefix. For example, triple <10.10.0.0, 16, 16> represents prefixes 10.10.0.0/16 (i.e., from 10.10.0.0/16 to 10.10.0.0/16). As another example, triple <20.20.15.0, 20, 24> represents prefixes from 20.20.15.0/20 to 20.20.15.0/24. In an embodiment, the MaskLen must be less than or equal to LeMaskLen, except for when LeMaskLen=0. When LeMaskLen=0, the triple <IPv4 Address, MaskLen, 0> represents prefix IPv4 Address/MaskLen.

Figure 7:
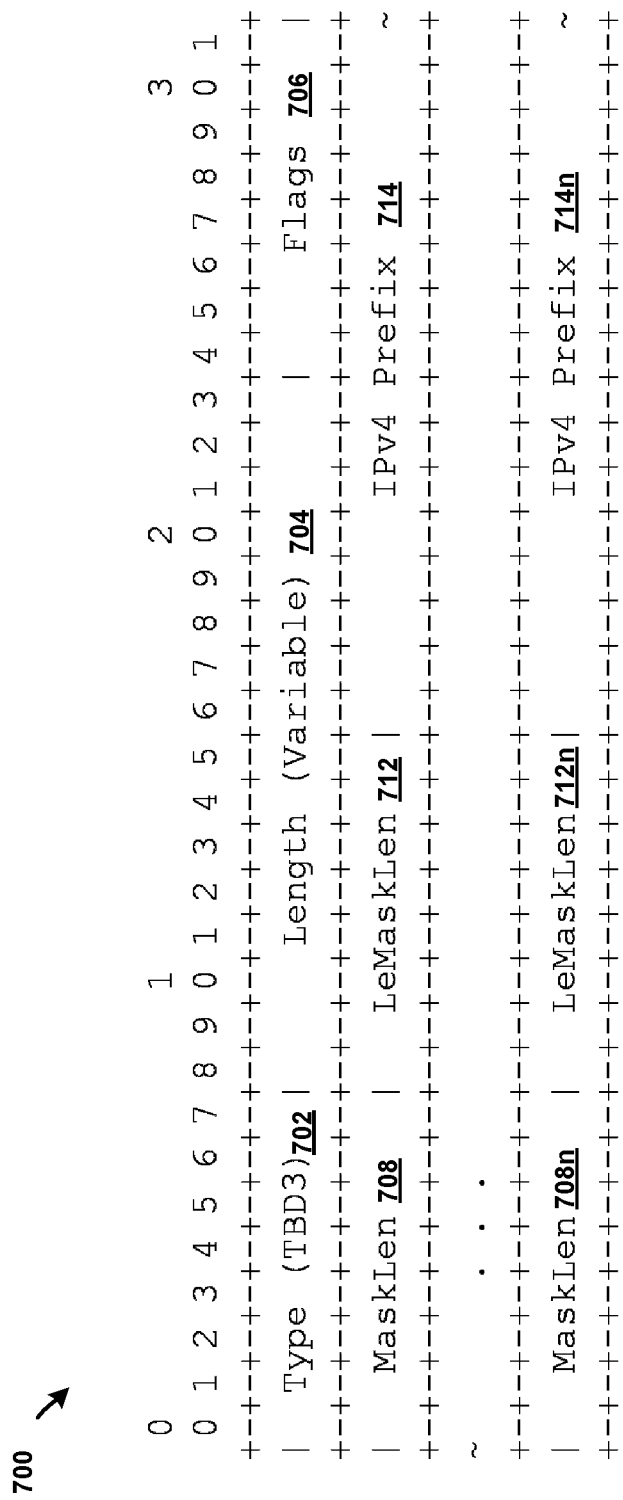
FIG. 7 is a schematic diagram illustrating an IPv4 Prefix Range wide-community-Atom according to another embodiment of the present disclosure.

FIG. 7 is a schematic diagram illustrating an IPv4 Prefix Range wide-community-Atom 700 according to another embodiment of the present disclosure. The IPv4 Prefix Range wide-community-Atom 700 is an optimized form of the IPv4 Prefix Range wide-community-Atom 600 in FIG. 6. The IPv4 Prefix Range wide-community-Atom 700 includes a Type 702 field, Length 704 field, and Flags 706 field. The Type 702 field specifies a value, which is to be determined (TBD), to indicate that it is a IPv4 Prefix Range wide-community-Atom 700. The Length 704 field specifies the length of the IPv4 Prefix Range wide-community-Atom 700, excluding the Type 702 field and the Length 704 field. The Flags 706 field can be used to specify one or more flags for the IPv4 Prefix Range wide-community-Atom 700.

The IPv4 Prefix Range wide-community-Atom 700 includes a number of triples in the form of <MaskLen 708 field, LeMaskLen 712 field, IPv4 Prefix 714>, <MaskLen 708*n* field, LeMaskLen 712*n* field, and IPv4 Prefix 714*n*>. Each triple <MaskLen, LeMaskLen, IPv4 Prefix> represents an IPv4 prefix range from IPv4 Prefix/MaskLen to IPv4 Prefix/LeMaskLen. For example, triple <16, 16, 10.10.0.0> represents prefixes 10.10.0.0/16 (i.e., from 10.10.0.0/16 to 10.10.0.0/16). As another example, triple <20, 24, 20.20.15.0> represents prefixes from 20.20.15.0/20 to 20.20.15.0/24.

Figure 8:
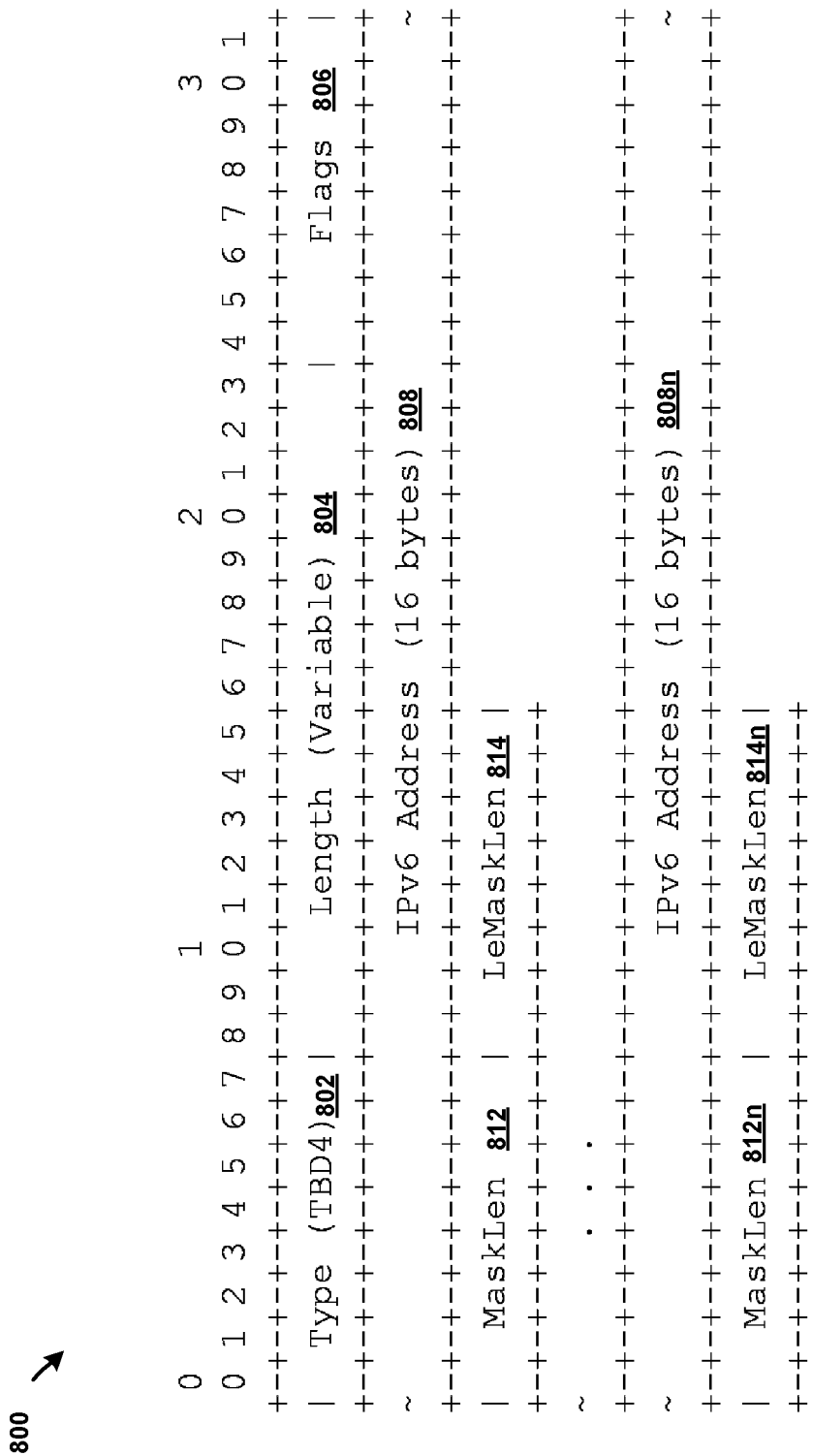
FIG. 8 is a schematic diagram illustrating an IPv6 Prefix Range wide-community-Atom according to an embodiment of the present disclosure.

FIG. 8 is a schematic diagram illustrating an IPv6 Prefix Range wide-community-Atom 800 according to an embodiment of the present disclosure. The IPv6 Prefix Range wide-community-Atom 800 represents a range of IPv6 prefixes. The IPv6 Prefix Range wide-community-Atom 800 includes a Type 802 field, Length 804 field, and Flags 806 field. The Type 802 field specifies a value, which is to be determined (TBD), to indicate that it is a IPv6 Prefix Range wide-community-Atom 800. The Length 804 field specifies the length of the IPv6 Prefix Range wide-community-Atom 800, excluding the Type 802 field and the Length 804 field. The Flags 806 field can be used to specify one or more flags for the IPv6 Prefix Range wide-community-Atom 800.

The IPv6 Prefix Range wide-community-Atom 800 includes a number of triples in the form of <IPv6 Address 808 field, MaskLen 812 field, LeMaskLen 814 field>, . . . , and <IPv6 Address 808*n* field, MaskLen 812*n* field, and LeMaskLen 814*n* field>. Each triple <IPv6 Address, MaskLen, LeMaskLen> represents an IPv6 prefix range from IPv6 Address/MaskLen to IPv6 Address/LeMaskLen. For example, triple <10.10.0.0, 16, 16> represents prefixes 10.10.0.0/16 (i.e., from 10.10.0.0/16 to 10.10.0.0/16). As another example, triple <20.20.15.0, 20, 24> represents prefixes from 20.20.15.0/20 to 20.20.15.0/24. In an embodiment, the MaskLen must be less than or equal to LeMaskLen, except for when LeMaskLen=0. When LeMaskLen=0, the triple <IPv6 Address, MaskLen, 0> represents prefix IPv6 Address/MaskLen.

Figure 9:
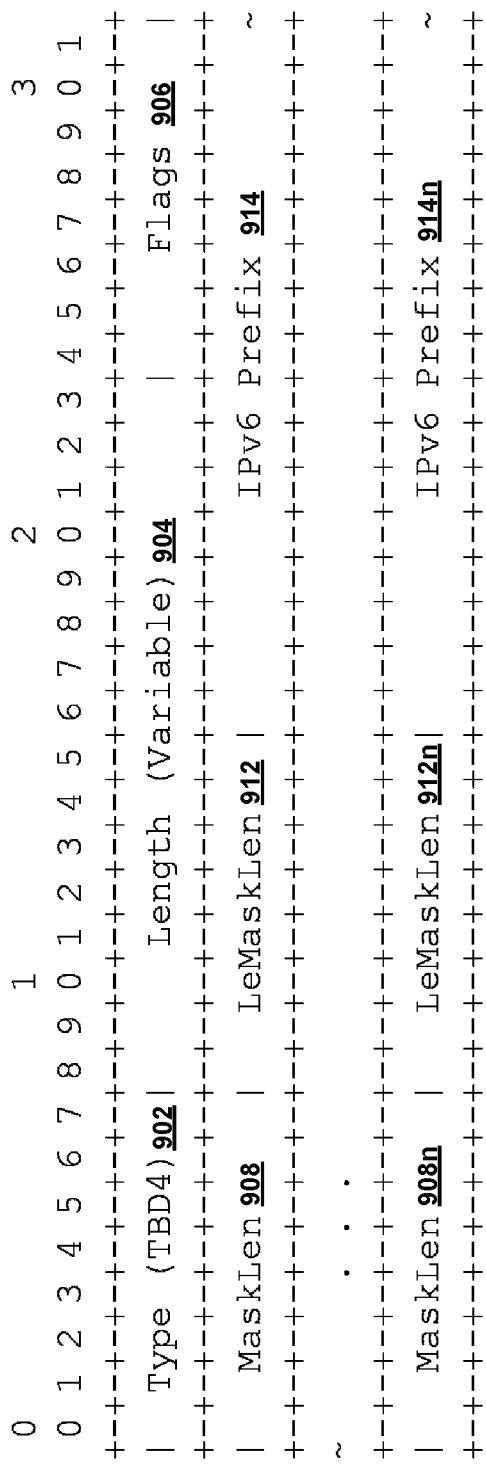
FIG. 9 is a schematic diagram illustrating an IPv6 Prefix Range wide-community-Atom according to another embodiment of the present disclosure.

FIG. 9 is a schematic diagram illustrating an IPv6 Prefix Range wide-community-Atom 900 according to another embodiment of the present disclosure. The IPv6 Prefix Range wide-community-Atom 900 is an optimized form of the IPv6 Prefix Range wide-community-Atom 800 in FIG. 8. The IPv6 Prefix Range wide-community-Atom 900 includes a Type 902 field, Length 904 field, and Flags 906 field. The Type 902 field specifies a value, which is to be determined (TBD), to indicate that it is a IPv6 Prefix Range wide-community-Atom 900. The Length 904 field specifies the length of the IPv6 Prefix Range wide-community-Atom 900, excluding the Type 902 field and the Length 904 field. The Flags 906 field can be used to specify one or more flags for the IPv6 Prefix Range wide-community-Atom 900.

The IPv6 Prefix Range wide-community-Atom 900 includes a number of triples < in the form of MaskLen 908 field, LeMaskLen 912 field, IPv6 Prefix 914 field>, . . . , and <MaskLen 908*n* field, LeMaskLen 912*n* field, IPv6 Prefix 914*n* field>. Each triple <MaskLen, LeMaskLen, IPv6 Prefix> represents an IPv6 prefix range from IPv6 Prefix/MaskLen to IPv6 Prefix/LeMaskLen.

Figure 10:
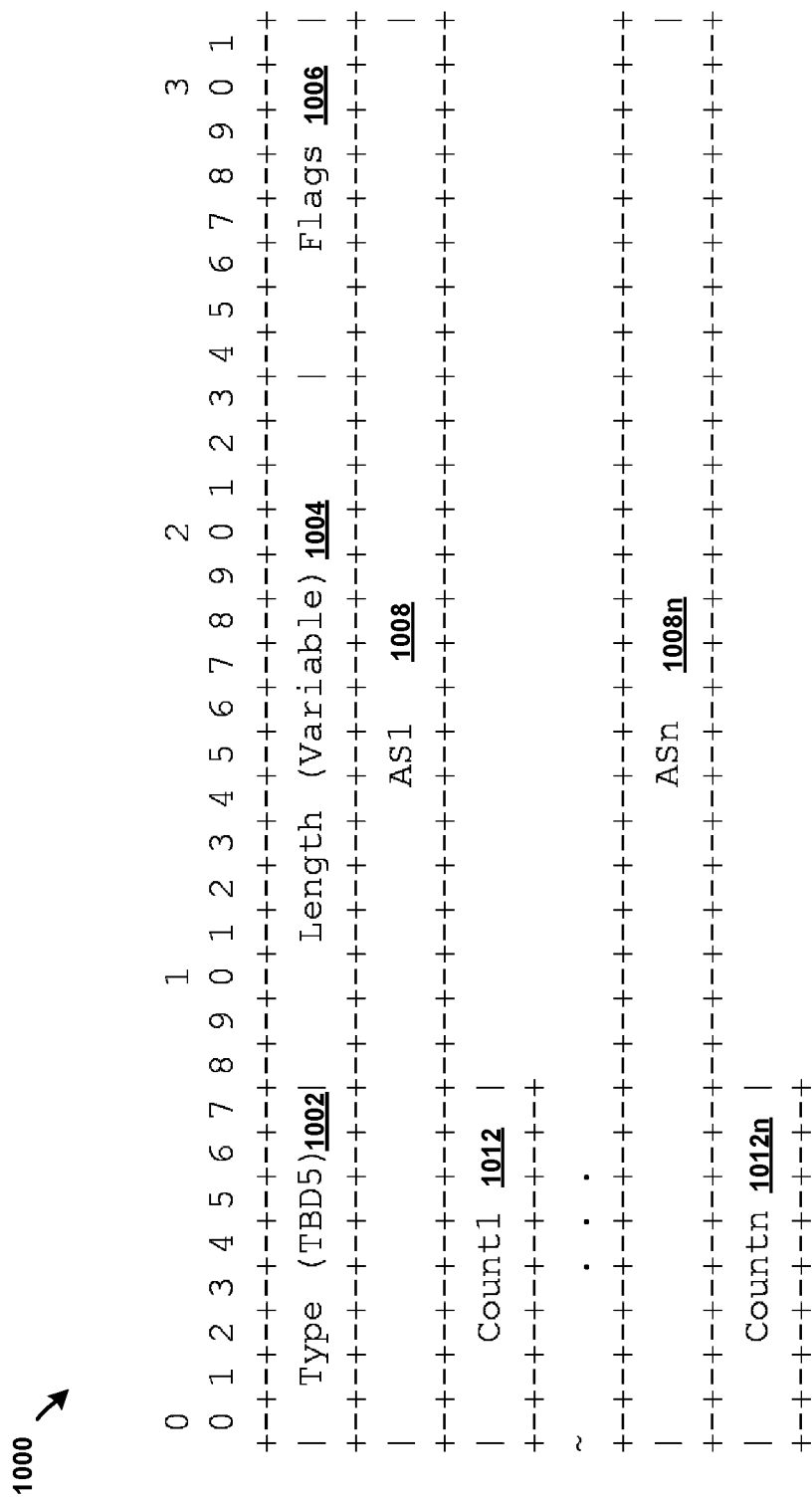
FIG. 10 is a schematic diagram illustrating an AS Path wide-community-Atom according to an embodiment of the present disclosure.

FIG. 10 is a schematic diagram illustrating an AS Path wide-community-Atom 1000 according to an embodiment of the present disclosure. The AS Path wide-community-Atom 1000 includes a Type 1002 field, Length 1004 field, and Flags 1006 field. The Type 1002 field specifies a value, which is to be determined (TBD), to indicate that it is a AS Path wide-community-Atom 1000. The Length 1004 field specifies the length of the AS Path wide-community-Atom 1000, excluding the Type 1002 field and the Length 1004 field. The Flags 1006 field can be used to specify one or more flags for the AS Path wide-community-Atom 1000.

The AS Path wide-community-Atom 1000 represents a sequence of AS numbers (e.g., AS1 1008-ASn 1008*n*). For an AS number that occurs multiple times in a row in a path, it is represented by the AS number 1008 and a count 1012 indicating the times that the AS number 1008 occurs. For example, AS Path "123456, 6553603, 6553603, 6553603" is represented by AS1=123456, Count1=1, AS2=6553603, and Count2=3.

Figure 11:
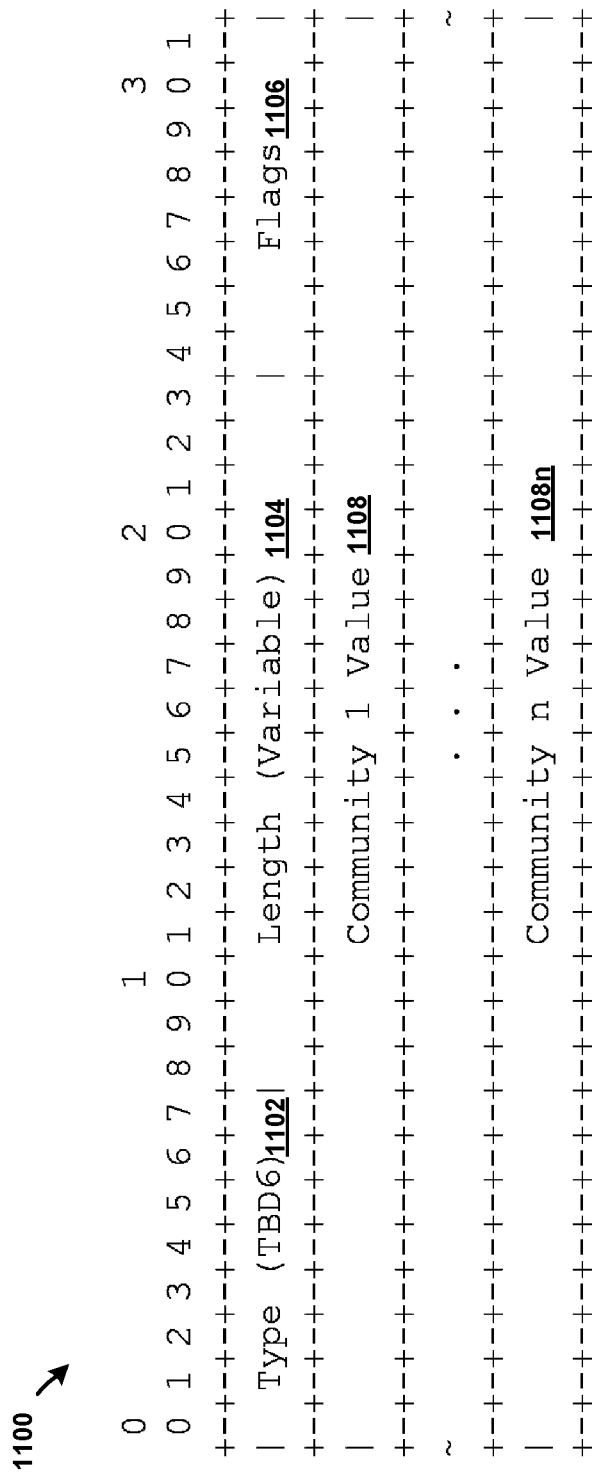
FIG. 11 is a schematic diagram illustrating a Communities wide-community-Atom according to an embodiment of the present disclosure.

FIG. 11 is a schematic diagram illustrating a Communities wide-community-Atom 1100 according to an embodiment of the present disclosure. The Communities wide-community-Atom 1100 includes a Type 1102 field, Length 1104 field, and Flags 1106 field. The Type 1102 field specifies a value, which is to be determined (TBD), to indicate that it is a Communities wide-community-Atom 1100. The Length 1104 field specifies the length of the Communities wide-community-Atom 1100, excluding the Type 1102 field and the Length 1104 field. The Flags 1106 field can be used to specify one or more flags for the Communities wide-community-Atom 1100. The Communities wide-community-Atom 1100 represents a list of communities values (e.g., Community 1 Value 1108-Community n Value 1108*n*). The community values represent a list of actions such as those described in FIG. 15.

FIG. 12 is a schematic diagram illustrating an Add AS Path wide-community-Atom 1200 according to an embodiment of the present disclosure. The Add AS Path wide-community-Atom 1200 includes a Type 1202 field, Length 1204 field, and OP 1206 field. The Type 1202 field specifies a value, which is to be determined (TBD), to indicate that it is an Add AS Path wide-community-Atom 1200. The Length 1204 field specifies the length of the Add AS Path wide-community-Atom 1200, excluding the Type 1202 field and the Length 1204 field. The OP 1206 field contains a value that specifies a particular operation to perform on an AS Path. For example, in an embodiment, when OP 1206=1, the sequence of AS numbers represented in (AS 1208, Count1 1212, . . . , ASn 1208*n*, CountN 1212*n*) are added in the end of the existing AS Path, and when OP 1206=2, the sequence of AS numbers represented in (AS 1208, Count1 1212, . . . , ASn 1208*n*, CountN 1212*n*) are added in the front of the existing AS Path.

FIG. 13 is a schematic diagram illustrating a Change MED wide-community-Atom 1300 according to an embodiment of the present disclosure. The Change MED wide-community-Atom 1300 includes a Type 1302 field, Length 1304 field, operation (OP) 1306 field, and Value 1308 field. The Type 1302 field specifies a value, which is to be determined (TBD), to indicate that it is a Change MED wide-community-Atom 1300. The Length 1304 field specifies the length of the Change MED wide-community-Atom 1300, excluding the Type 1302 field and the Length 1304 field. The OP 1306 field contains a value that specifies a particular operation to perform on a BGP MED Attribute. The BGP MED Attribute provides a dynamic way to influence another AS in the way to reach a certain route when there are multiple entry points for that AS. BGP follows a systematic procedure for choosing the best path. There are other important attributes such as weight, local preference, originate route, and AS path that are taken in to account before considering the MED attribute. In an embodiment, if any of these other criteria matches, the MED attribute will not be considered. When all other factors are equal, the exit point with the lowest MED is typically preferred.

In an embodiment, the Change MED wide-community-Atom 1300 indicates to change the MED attribute according to the OP 1306 field. As an example embodiment, when the OP 1306 field=1, assign the value in the Value 1308 field to the existing MED attribute, and when the OP 1306 field=2, add the value in the Value 1308 field to the existing MED attribute. In an embodiment, if the sum of the value in the Value 1308 field and value of the existing MED attribute is greater than the maximum value for MED attribute, then the maximum value is assigned to the MED attribute. When OP 1306 field=3, subtract the value in the Value 1308 field from the existing MED attribute. In an embodiment, if the existing Med minus the value in the Value 1308 field is less than 0, then assign 0 to the MED attribute.

Figure 14:
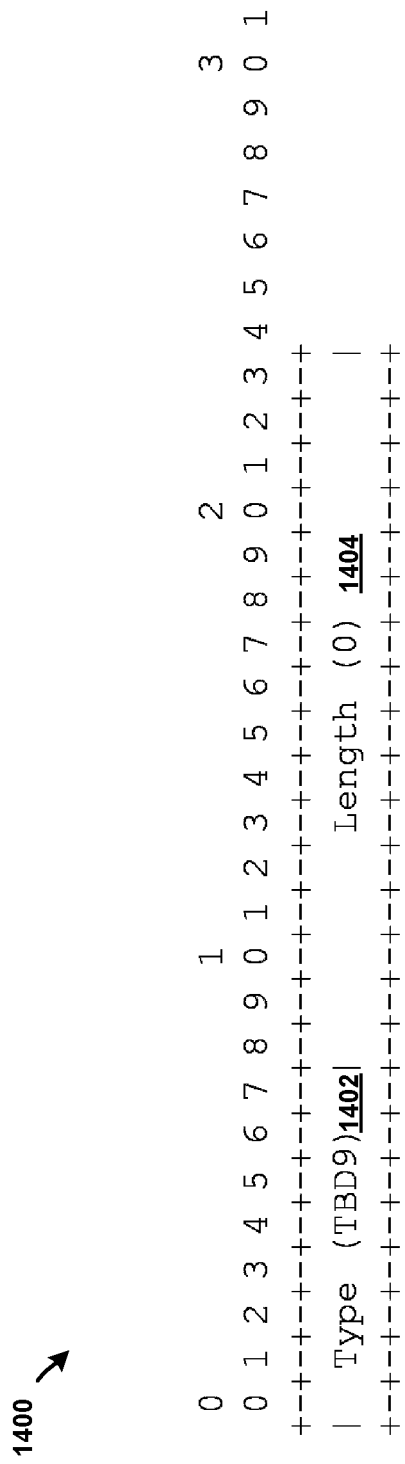
FIG. 14 is a schematic diagram illustrating a Deny wide-community-Atom according to an embodiment of the present disclosure.

FIG. 14 is a schematic diagram illustrating a Deny wide-community-Atom 1400 according to an embodiment of the present disclosure. The Deny wide-community-Atom 1400 includes a Type 1402 field and Length 1404 field. The Type 1402 field specifies a value, which is to be determined (TBD), to indicate that it is a Deny wide-community-Atom 1400. The Length 1404 field specifies the length of the Deny wide-community-Atom 1400, which is zero (0) because the Deny wide-community-Atom 1400 does not include a Value field. The Deny wide-community-Atom 1400 is used to indicate a Deny action.

Figure 15:
FIG. 15 is a chart illustrating existing and new Wide Communities Values according to an embodiment of the present disclosure.

FIG. 15 is a chart 1500 illustrating existing and new Wide Communities Values according to an embodiment of the present disclosure. A community value indicates what set of actions a router is requested to take upon reception of a route containing a BGP wide community container. The semantics of this value depend on whether this is a private/local community or an IANA registered community.

Some of the existing values (from 1 to 24) and the two new values for actions are defined as illustrated in the chart 1500. The existing Wide Communities Values include "Blackhole" (Type Value 1), "Source Filter" (Type Value 2), and "Free Pool" (Type Value 24). The two new Wide Communities Values consist of "Change Attributes" (Type Value TBD11) and "No Advertise" (Type Value TBD12).

In an embodiment, when action "Change Attributes" is used, multiple attributes can be changed. The parameters and operations for the action are represented by the Atoms related to the operations. For example, the Atoms may be Add AS Path wide-community-Atom 1200 as described in FIG. 12 and/or Change MED wide-community-Atom 1300 as described in FIG. 13. These Atoms are included in a BGP Wide Community Parameter(s) TLV as illustrated in FIG. 16. When "No Advertise" is used, the BGP peer is instructed to not advertise the route.

FIG. 16 is a schematic diagram illustrating an example encoding for a BGP wide community container 1600 for change attributes according to an embodiment of the present disclosure. The BGP wide community container 1600 has a Type field 1602 that is set to one (1) to indicate that it is a BGP wide community container (or BGP Wide Community for short). The BGP wide community container 1600 includes a Flags 1604 field, Reserved 1606 field, and Length 1608 field. The Flags 1604 field can be used to control common behavior including the transitivity of the BGP wide community container 1600. For example, if the Flags 1604 field is set to zero (0), the community in the BGP wide community container 1600 is transitive across AS boundaries, but not across an administrative boundary, and if the Flags 1604 field is set to one (1), the community in the BGP wide community container 1600 is transitive across all ASes. In an embodiment, the Reserved 1606 field is set to zero when originated and is ignored upon receipt. The Length 1608 field represents the total length of the BGP wide community container 1600 in octets, excluding the Type field 1602 and the Length 1608. In the depicted embodiment, the length of the BGP wide community container 1600 is 71 octets.

The BGP wide community container 1600 specifies a new wide community action 1612 called "Change Attributes" (Type Value TBD11) as described in FIG. 15. The BGP wide community container 1600 includes a Source AS number 1614 and a Context AS number 1616. The Source AS number 1614 is 4 octets and indicates the AS originating the BGP wide community container 1600. The Context AS number 1616 is 4 octets and identifies the AS that provides the semantics to interpret the BGP wide community container 1600.

The value of the Target(s) TLV field 1618 (Sub-Type 1) is a series of Atom TLVs that define the matching criteria for the BGP wide community container 1600. The BGP wide community container 1600 may have a number of targets that it applies to. If any given target matches per the semantics of that Atom for the BGP wide community container 1600, the BGP wide community container 1600 is considered as a match, and the action defined by the BGP wide community container 1600 is to be executed. The Length field 1622 represents the length of the Target(s) TLV field 1618 in octets.

In accordance with the disclosed embodiments, the BGP wide community container 1600 is configured to be able to change multiple route attributes when the route matches the given conditions in the BGP wide community container 1600. In the depicted embodiment, the matching conditions of the BGP wide community container 1600 are specified using an IPv4 Prefix Range wide-community-Atom 700 as described in FIG. 7, and an AS Path wide-community-Atom 1000 as described in FIG. 10. For instance, the IPv4 Prefix Range wide-community-Atom 700 in the BGP wide community container 1600 matches IPv4 Prefix Range 20.20.15.0/20 to 20.20.15.0/24 based on an IPv4 Prefix of 20.20.15, a MaskLen of 20, and a LeMaskLen of 24. The AS Path wide-community-Atom 1000 in the BGP wide community container 1600 matches AS-path 6553601 6553601.

The actions to be applied if the matching conditions are satisfied are specified in the BGP wide community container 1600 using a Change MED wide-community-Atom 1300 as described in FIG. 13, and an Add AS Path wide-community-Atom 1200 as described in FIG. 12. In the depicted embodiment, the Change MED wide-community-Atom 1300 in the BGP wide community container 1600 adds 12345 to the existing MED (e.g., apply MED=MED+12345). The Add AS Path wide-community-Atom 1200 in the BGP wide community container 1600 adds AS sequence 123456, 6553602, 6553602, 6553602, 6553602 to the end of an existing AS Path (e.g., apply add as-path 123456, 6553602, 6553602, 6553602, 6553602).

The BGP wide community container 1600 can also include an ExcTargetTLV 1624 field (Type Value 2) and a Param TLV 1626 field. The ExcTargetTLV 1624 field can contain an optional list that encodes where the actions specified in the BGP wide community container 1600 should not be taken. The Param TLV 1626 field can contain an optional list of Atoms that encodes additional information (i.e., parameters) that applies to the actions of the BGP wide community container 1600.

Figure 17:
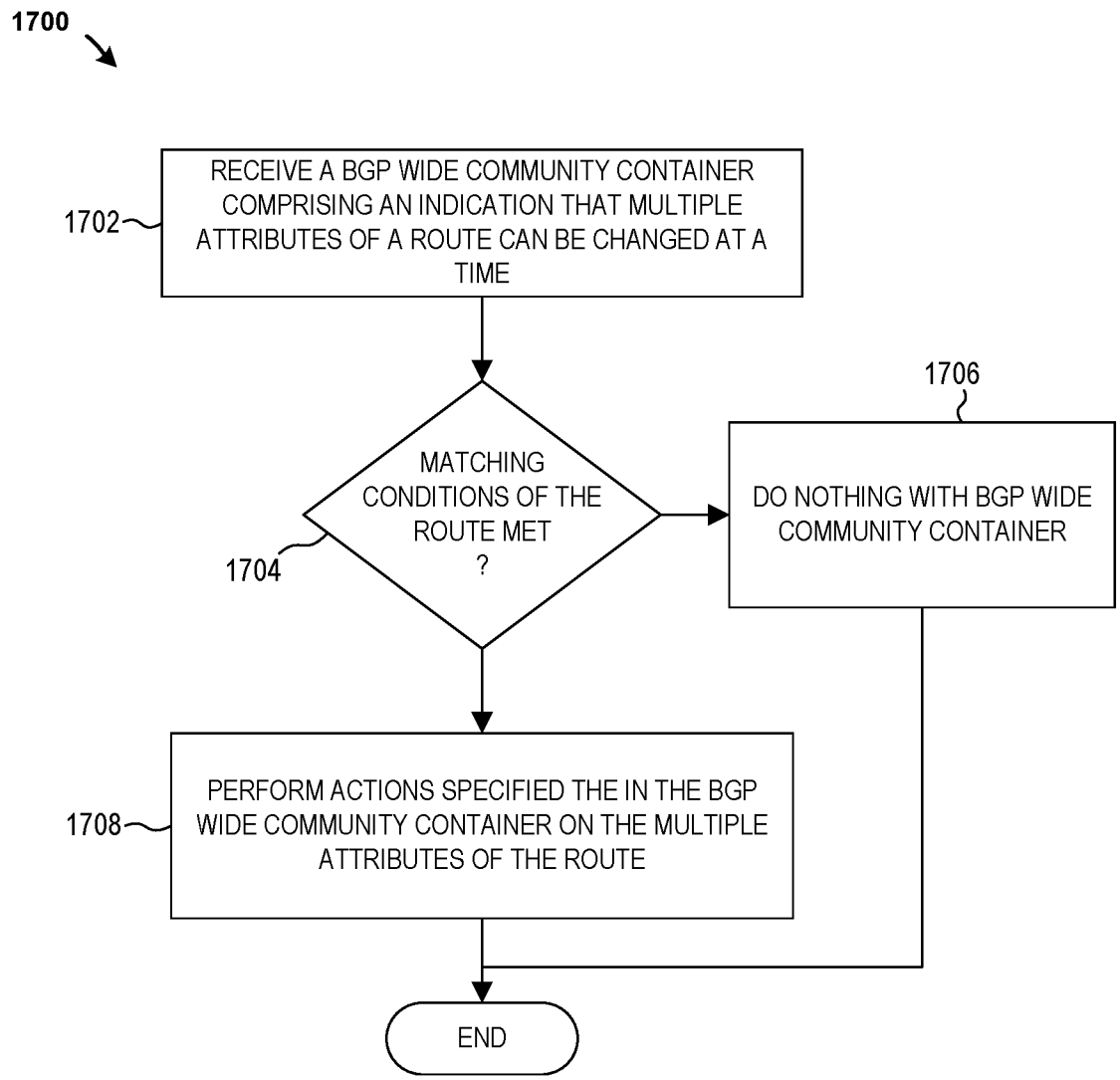
FIG. 17 is a flowchart illustrating a method for extending BGP to change multiple route attributes at a time according to an embodiment of the present disclosure.

FIG. 17 is a flowchart illustrating a method 1700 for extending BGP to change multiple route attributes at a time according to an embodiment of the present disclosure. The method 1700 can be executed by a network node such as, any controller, router, and switch. As an example, the method 200 can be executed by BR21 in FIG. 1. The method 1700 begins, at step 1702, by receiving a BGP wide community container that includes an indication that multiple route attributes can be changed at a time. The BGP wide community container also includes one or more matching conditions of a route.

The method 1700, at step 1704, determines whether the route conditions specified in the BGP wide community container are satisfied. For example, the matching conditions can be an IPv4 Prefix Range or IPv6 Prefix Range as described above. At step 1708, the method 1700 performs the actions specified the in the BGP wide community container on the multiple route attributes when the one or more route conditions are satisfied. Non-limiting examples of actions that can be performed include adding a sequence of AS numbers to an existing AS Path and changing the MED attribute. When the method 1700 determines that the one or more route conditions specified in the BGP wide community container are not met, then the method 1700, at step 1706, does nothing with the BGP wide community container.

Figure 18:
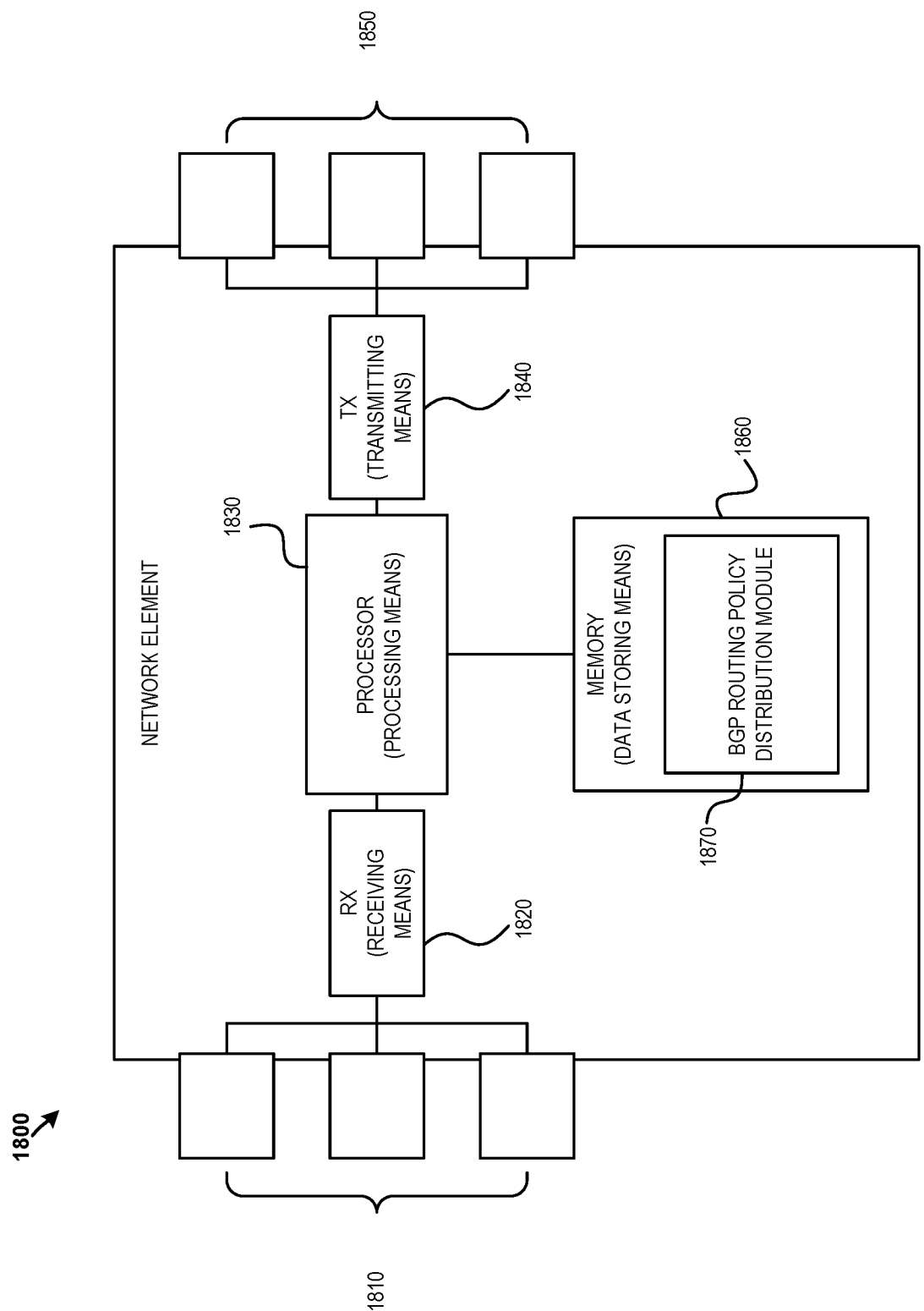
FIG. 18 is a schematic diagram illustrating a network element according to an embodiment of the present disclosure.

FIG. 18 is a schematic diagram illustrating a network element 1800 according to an embodiment of the present disclosure. The network element 1800 can be any type of network node, controller, router, and switch such as, but not limited to, BR21 in FIG. 1. The network element 1800 includes receiver units (RX) 1820 or receiving means for receiving data via ingress ports 1810. The network element 1800 also includes transmitter units (TX) 1840 or transmitting means for transmitting via data egress ports 1850.

The network element 1800 includes a memory 1860 or data storing means for storing the instructions and various data. The memory 1860 can be any type of or combination of memory components capable of storing data and/or instructions. For example, the memory 1860 can include volatile and/or non-volatile memory such as read-only memory (ROM), random access memory (RAM), ternary content-addressable memory (TCAM), and/or static random-access memory (SRAM). The memory 1860 can also include one or more disks, tape drives, and solid-state drives. In some embodiments, the memory 1860 can be used as an over-flow data storage device to store programs when such programs are selected for execution, and to store instructions and data that are read during program execution.

The network element 1800 has one or more processors 1830 or other processing means (e.g., central processing unit (CPU)) to process instructions. The processor 1830 may be implemented as one or more CPU chips, cores (e.g., as a multi-core processor), field-programmable gate arrays (FPGAs), application specific integrated circuits (ASICs), and digital signal processors (DSPs). The processor 1830 is communicatively coupled via a system bus with the ingress ports 1810, RX 1820, TX 1840, egress ports 1850, and memory 1860. The processor 1830 can be configured to execute instructions stored in the memory 1860. Thus, the processor 1830 provides a means for performing any computational, comparison, determination, initiation, or configuration (e.g., setting the F-bit or I-bit) steps, or any other action, corresponding to the claims when the appropriate instruction is executed by the processor. In some embodiments, the memory 1860 can be memory that is integrated with the processor 1830.

In one embodiment, the memory 1860 stores a BGP Routing Policy Distribution Module 1870. The BGP Routing Policy Distribution Module 1870 includes data and executable instructions for implementing the disclosed embodiments. For instance, the BGP Routing Policy Distribution Module 1870 can include instructions for implementing the methods described in FIGS. 17 and 2. The inclusion of the BGP Routing Policy Distribution Module 1870 substantially improves the functionality of the network element 1800.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

Following the claims below is a document that may be submitted to a standards body and which embodies the present disclosure.

What is claimed is:

1. A method for extending Border Gateway Protocol (BGP) to change multiple route attributes of a route at a time, the method comprising:
    receiving a BGP wide community container, the BGP wide community container comprising:
        an indication that multiple route attributes can be changed at a time,
        one or more route conditions, and
        actions to perform on the multiple route attributes when the one or more route conditions are met;
    determining whether the one or more route conditions of the route are satisfied; and
    performing the actions specified in the BGP wide community container on the multiple route attributes when the one or more route conditions are satisfied.

2. The method of claim 1, wherein the indication is a wide community type value that corresponds to a change attributes action.

3. The method of claim 1, wherein the one or more route conditions are specified in at least one of the following wide-community-Atoms: a BGP Internet Protocol version 4 (IPv4) Session wide-community-Atom, a BGP Internet Protocol version 6 (IPv6) Session wide-community-Atom, an IPv4 Prefix Range wide-community-Atom, an IPv6 Prefix Range wide-community-Atom, and an Autonomous System (AS) Path wide-community-Atom.

4. The method of claim 1, wherein the actions to perform on the multiple route attributes are specified in at least one of the following wide-community-Atoms: a Communities wide-community-Atom, an Add AS-Path wide-community-Atom, a Change Multi-Exit Discriminator (MED) wide-community-Atom, and a Deny wide-community-Atom.

5. The method according to claim 3, wherein the BGP IPv4 Session wide-community-Atom comprises a Type field, Length field, Local IPv4 Address field, and Remote IPv4 Address field.

6. The method according to claim 3, wherein the BGP IPv6 Session wide-community-Atom comprises a Type field, Length field, Local IPv6 Address field, and Remote IPv6 Address field.

7. The method according to claim 3, wherein the IPv4 Prefix Range wide-community-Atom comprises a Type field, Length field, Flags field, and a number of triples consisting of <IPv4 Address field, MaskLen field, LeMaskLen field>.

8. The method according to claim 3, wherein the IPv4 Prefix Range wide-community-Atom comprises a Type field, Length field, Flags field, and a number of triples consisting of <MaskLen field, LeMaskLen field, IPv4 Prefix field>.

9. The method according to claim 3, wherein the IPv6 Prefix Range wide-community-Atom comprises a Type field, Length field, Flags field, and a number of triples consisting of <IPv6 Address field, MaskLen field, LeMaskLen field>.

10. The method according to claim 3, wherein the IPv6 Prefix Range wide-community-Atom comprises a Type field, Length field, Flags field, and a number of triples consisting of <MaskLen field, LeMaskLen field, IPv6 Prefix field>.

11. The method according to claim 3, wherein the AS Path wide-community-Atom comprises a Type field, Length field, Flags field, and a sequence of AS numbers fields.

12. The method according to claim 4, wherein the Communities wide-community-Atom comprises a Type field, Length field, Flags field, and a list of Community Value fields that represent a list of actions.

13. The method according to claim 4, wherein the Add AS-Path wide-community-Atom comprises a Type field, Length field, an operation (OP) field, and a sequence of AS fields.

14. The method according to claim 4, wherein the Change MED wide-community-Atom comprises a Type field, Length field, operation (OP) field, and a Value field.

15. The method according to claim 4, wherein the Deny wide-community-Atom comprises a Type field and Length field.

16. A network node comprising:
    a memory storing instructions; and
    a processor coupled to the memory, the processor configured to execute the instructions to cause the network node to:
    receive a Border Gateway Protocol (BGP) wide community container, the BGP wide community container comprising:
        an indication that multiple route attributes can be changed at a time, one or more route conditions, and
actions to perform on the multiple route attributes when the one or more route conditions are met;
determine whether the route conditions are satisfied; and
perform the actions specified in the BGP wide community container on the multiple route attributes when the one or more route conditions are satisfied.

17. The network node of claim 16, wherein the indication is a wide community type value that corresponds to a change attributes action.

18. The network node of claim 16, wherein the one or more route conditions are specified in at least one of the following wide-community-Atoms: a BGP Internet Protocol version 4 (IPv4) Session wide-community-Atom, a BGP Internet Protocol version 6 (IPv6) Session wide-community-Atom, an IPv4 Prefix Range wide-community-Atom, an IPv6 Prefix Range wide-community-Atom, and an autonomous system (AS) Path wide-community-Atom.

19. The network node of claim 16, wherein the actions to perform on the multiple route attributes are specified in at least one of the following wide-community-Atoms: a Communities wide-community-Atom, an Add AS-Path wide-community-Atom, a Change Multi-Exit Discriminator (MED) wide-community-Atom, and a Deny wide-community-Atom.

20. A method for extending Border Gateway Protocol (BGP) to change multiple route attributes, the method comprising:
providing, in a BGP wide community container, an indication that multiple route attributes can be changed at a time;
providing, in the BGP wide community container, one or more route conditions;
providing, in the BGP wide community container, actions to perform on the multiple route attributes when the one or more route conditions are satisfied; and
transmitting the BGP wide community container to a neighboring BGP router.

* * * * *